Feb. 7, 1967  C. B. VOGEL ETAL  3,303,460
WELL LOGGING
Filed June 27, 1958
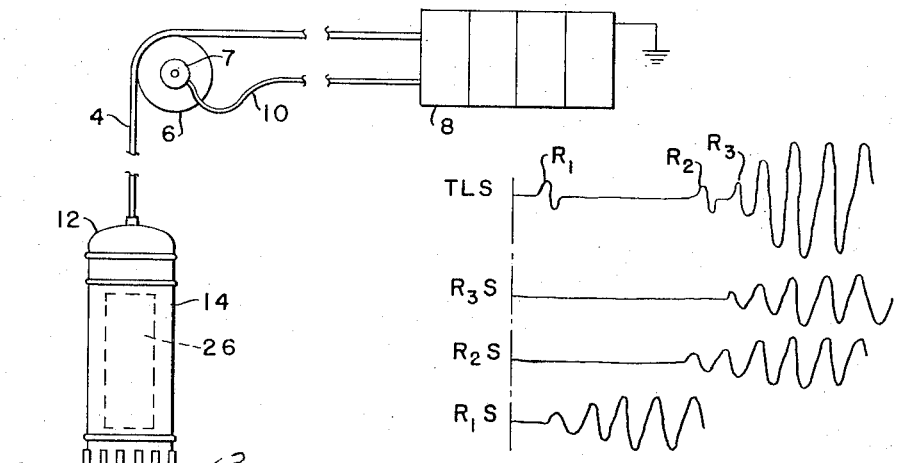
FIG. 3
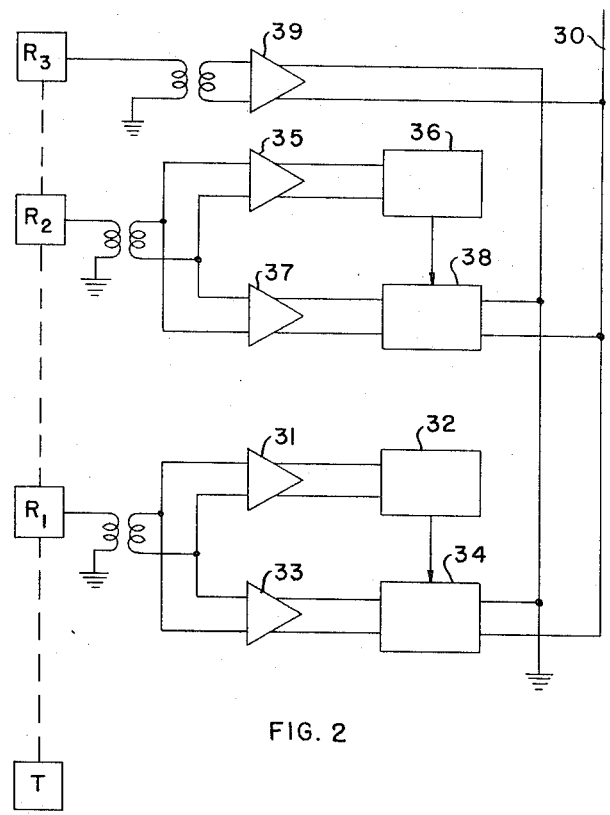
FIG. 2
FIG. 1
INVENTORS:
C. B. VOGEL
T. W. LAMB
M. I. PALMER, JR.
BY: *James Todorovic*
THEIR ATTORNEY

United States Patent Office 3,303,460
Patented Feb. 7, 1967

3,303,460
WELL LOGGING
Charles B. Vogel, Thomas W. Lamb, and Minter I. Palmer, Jr., all of Houston, Tex., assignors to Shell Oil Company, a corporation of Delaware
Filed June 27, 1958, Ser. No. 745,073
4 Claims. (Cl. 340—18)

This invention relates to acoustic or seismic well logging and more particularly to the type of seismic logging utilizing a transient type of device which is lowered into the borehole to determine the velocity of seismic waves through the rock formations surrounding the borehole of the well.

The transient device usually employs a transmitter for generating discrete acoustical impulses and one or more vertically separated receivers for detecting the arrival of each impulse at the receiver and converting it to a proportional electrical signal. The electrical signals are then transmitted to the surface where they are observed on suitable instruments and recorded or used to operate suitable recorders to indicate properties of the rock formations. From this information it is possible to determine the average velocity of the impulse through the rock formations surrounding the borehole at the particular depth at which the transient device is located when each impulse is generated.

In the usual practice of this type of seismic well logging two receivers are employed, vertically separated from a single transmitter. The distance between the two receivers and between the nearest receiver and the transmitter is usually equal and on the order of one to ten feet. As the device is moved along the borehole, the recorded measurements amount to series of average velocities of the acoustical pulses over the known spacing between the receivers measured at known depths in the borehole. While measurements of average velocities are useful in determining the characteristics of the rock formations surrounding a borehole they may miss the particular velocity of the impulse through a thin layer of rock or other formation of extreme importance in determining the petrophysical properties of the formations. The velocity of the acoustical waves generated by the impulse through a very thin layer of rock cannot be determined by usual methods of acoustical well logging with acceptable accuracy.

As used in acoustic logging devices the term transducer refers to a device capable of converting acoustical impulses into electrical signals or to one capable of converting electrical signals into acoustical impulses. These transducers are generally mounted at spaced locations along the length of an elongated subsurface instrument separated by known distances, depending on the purpose of the instrument. The distance between the effective center of a pair of transducers measured along a straight line is normally termed the spacing of an interval. Likewise the distance between a reference transducer and the midpoint of an interval is termed the range of the interval in question.

While the spacing or interval between receivers can be shorter for the purpose of resolving thin layers this is not an entirely satisfactory solution to the problem. All acoustic loggers are subject to at least a certain amount of errors due to irregularities in the borehole and imperfections in the operation of the remote indicating and recording units. These errors often make it doubtful whether the measurements indicate a thin streak formation or simply errors in the measurement. This situation is aggravated if small spacings or intervals between adjacent receivers are used.

Accordingly, it is the principal object of this invention to provide a novel process for acoustically logging a borehole which provides both average velocities over long intervals of the acoustical waves through the rock formations surrounding the borehole and actual velocities over short intervals through thin layers of rock in a single traverse of the borehole.

Another object of this invention is to provide a process for acoustically logging a borehole which utilizes a novel arrangement of at least one transmitter and at least two receivers to obtain both the average velocity of acoustical waves through the formations surrounding the borehole and the actual velocity of acoustical waves through thin layers of various formations.

A further object of this invention is to provide a process for acoustically logging a borehole which utilizes a unique arrangement of at least one transmitter transducer and two receiver transducers with two of the transducers being spaced a long interval apart and two of the transducers being spaced a short interval apart. The long interval is on the order of three to seven feet and in any case longer than the distance in which changes in the formations are apt to occur, while the short interval is on the order of three feet or less and in any case shorter than the distances within which significant velocity changes are apt to occur.

A still further object of this invention is to provide a process for acoustically logging a borehole with long and short interval spacing between the transducers with means for switching off the receiving transducers to prevent intermixing of the signals as they are transmitted.

The above objects and other advantages of this invention are obtained by using a transmitter which generates discrete acoustical pulses which are received by the spaced receivers. The first receiver may be spaced a short interval from the transmitter and measures the time required for the pulse to travel a short distance through the rock while the second receiver may be spaced a long interval from the first receiver and will measure the time required for the pulse to travel through the long distance between the two receivers.

The transmitter and each of the receivers produce a fluctuating electrical signal which indicates the time of generation or arrival of the pulse at each receiver and thus the time required for the pulse to travel the short and long intervals between the transducers. The electrical signals generated at each transducer is transmitted to the surface, where it may be observed on an oscilloscope and recorded by filming the traces appearing on the oscilloscope. Of course, other means may be used to observe and record the time interval between the generation and arrival of the impulse at the various transducers.

While it is possible to obtain satisfactory results in a well logging operation utilizing the process of this invention and only one transmitter and two receivers, the preferred method utilizes one transmitter and three receivers. The first receiver is spaced a long distance from the transmitter with the second receiver being spaced an equal distance from the first and the third receiver spaced a short distance from the second. This arrangement of receivers will provide a measurement of the average velocity of acoustical waves through the rock formation surrounding the borehole which is an indication of the average porosity of the rock formation and thus the possible presence of petroleum fluids. The arrangement also provides in the same logging operation an indication of the velocity through thin streaks of rocks having anomalous velocities as well as indicating the depth at which these streaks occur. A thin streak having an exceptionally high porosity is extremely important in well logging since it may indicate where and to what extent petroleum fluids are present within the rock formations. In the usual method of well logging these streaks are not detected since the change in the average velocity as measured by receivers spaced a long distance apart is only slightly effected by such a streak.

In practicing this invention it is desirable to use a switching arrangement when a commercial well logging cable is used with a plurality of receivers. When a receiver begins to receive energy due to arrival of an acoustical impulse the amplitude of its electrical signal does not, as might be expected, rise rapidly to a maximum value and then quickly diminish, but rather rises slowly and then decays slowly over a relatively long time. This characteristic complicates velocity measurements since the signal of one receiver is reaching a maximum amplitude at the same time the acoustical impulse is arriving at another receiver. Since the receiver signal has a relatively high frequency, the mile or more of logging cable offers considerable impedance to the signal and an opportunity for intermingling of receiver signals that are conveyed over one or more pairs of conductors. This problem is most conveniently solved by periodically switching off or disconnecting one or more receivers from the well logging cable to prevent interference between separate receiver signals.

The above and other objects of this invention will be more easily understood by those skilled in this art from the following description when taken with reference to the attached drawings.

FIGURE 1 is a diagrammatic illustration of a preferred arrangement of the components of surface and subsurface units involved in the practice of the present invention.

FIGURE 2 is a diagrammatic illustration of a switching arrangement for silencing or switching off a receiver.

FIGURE 3 is a schematic illustration of signal wave forms.

Referring to FIGURE 1, the illustrated apparatus is generally similar to that described in Patent No. 2,708,-485. The apparatus comprises a measuring unit consisting of an elongated tubular housing, designated by the numeral 2, adapted to be lowered into a borehole at the end of a cable 4, which is preferably a coaxial or multiconductor insulated cable. The cable 4 passes over a suitably powered and calibrated sheave 6, which may be coupled or associated with a selsyn-generator 7. The cable 4 is electrically connected to a surface unit 8, comprising the desired amplifying, controlling and indicating or recording elements. The sheave 6, or preferably the output of the selsyn-generator 7, is electrically connected to the unit 8, through a multiconductor cable 10, in order that the depth or level of the measuring unit may be measured or recorded at any instant together with the measurement signals from the measuring unit.

The housing 2 consists of a plurality of tubing members, preferably held in fluid-tight screw-threaded engagement with each other. These members may comprise an upper head connector 12, through which mechanical and electrical connection is effected between the housing 2, and the cable 4, an upper instrument case 14, and upper receiver $R_3$, an upper link member 16, a middle receiver $R_2$, a middle link member 18, a lower receiver $R_1$, a lower link member 20, a lower instrument case 22, and a bottom closure head 24, which may comprise a lead sinker weighing, for example, 50 pounds.

The basic elements of the apparatus are the transmitter T and the receivers $R_1$, $R_2$ and $R_3$. The purpose of the instrument cases 14 and 22 is to accommodate, in a pressure-tight manner, the auxiliary electric and electronic equipment necessary for the operation of the transmitter and the receivers, such as batteries, timing and relay switches, amplifiers, and other equipment, diagrammatically illustrated at 26 and 27. The primary purpose of the link members 16, 18 and 20 is to serve as electrical and mechanical connectors between the transmitter and the receivers.

The axial length of each of the sections 14 and 22 may vary from 2 to 4 feet, as necessary to house the auxiliary equipment. The axial length of the link members 16, 18 and 20 is set by the distances selected for the long and short distance intervals over which the velocities are to be measured. In the preferred arrangement illustrated, the link member 16 has a length such that the distance from receivers $R_2$ to $R_3$ is one foot. The link member 18 is long enough to provide a spacing of five feet between receivers $R_1$ and $R_2$, and the link member 20 is long enough to provide a separation of five feet between the transmitter and the receiver $R_1$. The transmitters and receivers may each have an appreciable axial length so that the length of the link members should be adjusted to provide the desired spacings between the effective centers of the transmitters and receivers.

The purpose of inserting the flexible members 16, 18 and 20 into the apparatus 2 is primarily to give the apparatus sufficient flexibility for operation in crooked boreholes by means of link members that are adapted to both maintain a fixed spacing between the transducers and retard the transmission of acoustic energy through the body of the apparatus 2.

In general, the apparatus employed in the practice of the present invention can be composed of presently known elements such as the surface indicating and recording unit, the well logging cable, the housing, and the impulse-generating and impulse-receiving transducers, and the flexible but substantially inextensible linkage members described in the previously mentioned patent and patent application. Although photo or oscillographic recording has a particular advantage, that type of recording may be accompanied by or replaced by other types of recording without departing from the spirit of this invention. For example, methods well known in the art may be used for converting varying time intervals into varying direct currents which then produce a continuous smooth curve on a chart. Likewise, conventional circuits adapted to display the amplitude of impulses received or the ratios of said amplitudes may be constructed by those skilled in the art.

The arrangement illustrated in FIGURE 1 is adapted for use in a fixed-relationship long- and short-distance logging operation. In such an operation, the pattern of the variations in the two types of measurements indicate their velocity. If the travel time of the seismic impulses over the long distance interval is represented as LT and the travel time over the short distance as ST, the travel times are normally interrelated by the equation $LT = K(ST)$ where K is the ratio of the length of the long interval to that of the short interval. As a formation of unusually low velocity is approached by a measuring unit in which the short interval is spaced ahead of the long interval, the quantity K(ST) becomes greater than LT. Then, as the larger proportions of the low velocity appear within the long interval, the quantity LT increases until both LT and K(ST) become equal if the formation is thick enough to accommodate both measurement intervals. As the measuring unit moves past the formation, the quantities K(ST) and LT decrease in sequence. Anomalous measurements due to short borehole irregularities, the off-centering of the measuring devices within the borehole are made obvious by the absence of the above pattern.

Various types of measurement programming can be used in a fixed-relationship long and short distance logging process. However, in any case, in order to obtain sufficient detail, the measurement repetition rate is preferably high enough so that a plurality of measurements are made per each unit of hole depth that corresponds to the length of at least the long measurement interval. The commonly employed speeds of moving the subsurface unit through the borehole range from about 6 to 180 feet per minute, or about 0.1 to 3 feet per second. The frequency at which the acoustic impulses are produced and the corresponding frequency with which the pulse velocities are measured, can suitably range from about 1 to 20 per second.

In one type of measurement programming, the travel of each seismic or acoustic pulse is timed across both the long and the short measurement intervals. For example, the transducer-controlling elements may be arranged so that each time a seismic or acoustic pulse is produced by the transmitter T, several hundred microseconds after the moment of the pulse production, seismic or acoustic energy will begin to arrive successively at receivers $R_1$, $R_2$ and $R_3$, causing the receivers to begin producing signals. The travel time across the long measurement interval is determined by measuring the time between the beginning of the signals at receivers $R_1$ and $R_2$ and the travel time across the short measurement interval is similarly determined from the beginnings of the signals at the receivers $R_2$ and $R_3$.

In another type of measurement programming, the travel of one pulse produced by the transmitter is measured across one measurement interval; for example, by measuring the time between arrivals of the seismic or acoustic energy at receivers $R_1$ and $R_2$. Then, the travel time for the next pulse is measured across the other measurement interval; for example, by measuring the time between the arrivals of the energy from that pulse at the receivers $R_2$ and $R_3$. As will be apparent to those skilled in the art, in such an arrangement the receivers $R_1$ and $R_3$ may be alternately connected and disconnected during the intervals between the production of the pulses. The connections and disconnections can be effected by means of conventional relays or other type switching elements.

In each of these types of programming, the measurement repetition rate is preferably selected in relation to the rate at which the subsurface unit is moved so that a plurality of measurements are made within a distance along the borehole corresponding to the length of the short measurement interval. The difference between the two alternatives simply amounts to a difference between the repetition rates at which the respective long and short interval measurements are made in connection with a given rate of pulse production. If the two measurements are made on each pulse, the repetition rate of the measurements over each interval is twice that obtained when the measurements are made across the one interval for one pulse, then across the other interval for the next pulse.

In the logging process of this invention the substantially undistorted wave forms of the initial portions of the receiver signals can be transmitted to the surface indicating and recording units. This method of telemetering enables both the instrument operator and the person using the log to appraise the normalcy of the instrument operation and also the character of the seismic or acoustic energy that is propagated through the various portions of the rock. To accomplish this, receiving transducers are preferably used at each end of each of the measuring units. During each of the measurements, the receiver at the beginning of the interval over which the measurement is being made, is silenced by an automatic cut-off receiver-silencing procedure. In the automatic cut-off, receiver-silencing procedure, the instant that a receiver begins to produce a signal is detected, and within a relatively short interval after the signaling begins, the application of the signal to the transmission line of the well logging cable is reduced to a suitable minimum. For example, in one method of employing such a silencing procedure, the output from the receiver to be silenced is fed into two channels. One of the channels is arranged so that a portion of the receiver output is amplified, applied to the transmission line, and sent on to the surface unit. The other channel is arranged so that an initial fluctuation of the portion of the receiver signal fed into that channel actuates the production of an electrical pulse. This electrical pulse is applied to a switching network in the other channel, where it actuates the discontinuance of the transmission of the receiver signal to the surface unit.

Referring to FIGURE 2, there is illustrated apparatus suitable for conducting a logging process of this invention in which the substantially undistorted wave forms of the receiver signals are transmitted to the surface. It comprises a system in which the illustrated type of receiver switching circuit is incorporated into a logging device in which the remaining components may consist of units of the type described in the patent and patent application referred to above. The receiver $R_1$ is coupled to an amplified circuit through which the receiver output is applied to conductor 30 of the well logging cable that extends up to the surface units. In the upper leg of the amplified circuit, the output from receiver $R_1$ is fed through amplifier 31 to the electrical pulse generator 32. At the same time, in the lower leg of the amplifier circuit, the receiver output is fed through the amplifier 33 to the switch network 34. The receiver $R_2$ is coupled to the similar amplifier circuit that contains amplifier 37 and switch network 38 in its lower leg. The receiver $R_3$ is coupled through amplifier 39 directly to the conductor 30.

Each of the amplifiers 31, 33, 35, 37 and 39 can comprise presently known types of vacuum tube or transistor amplifiers adapted to materially increase the amplitude of a fluctuating signal without serious distortion. Each of the pulse generators, 32 and 36, can comprise presently known devices adapted to receive a fluctuating electrical signal and respond to the arrival of a selected portion of the signal by the production of an electric voltage pulse such as a monostable multivibrator. Each of the switching networks, 34 and 38, can comprise presently known types of voltage controllable circuit such as a gate circuit which is disposed to be switched to a non-transmitting condition by a voltage pulse of the type produced by the monostable multivibrator.

In the operation of the device shown in FIGURE 2, when an impulse of seismic or acoustic energy reaches the receiver $R_1$, the receiver output signal is simultaneously applied to the amplifiers 31 and 33. The initial portions of the amplifier signal produced by amplifier 33 is instantaneously passed through the switching network 34 and applied to the transmission line conductor 30. The amplified signal produced by the amplifier 31 is instantaneously applied to the electric pulse generator 32. After a preselected amount of delay, or upon the occurrence of a preselected type of signal fluctuation, the pulse generator sends a pulse to switch network 34, to terminate the transmission of the receiver signal. The effective delay, that is, the time between the moment at which receiver $R_1$ begins to produce a signal and the moment at which the pulse from the monostable multivibrator terminates the transmission of the signal is preferably selected so that the signal termination occurs at a moment at which the signal has passed through a substantially minimum amplitude and assumed a polarity opposite to its initial polarity.

In the illustrated arrangement, the receivers $R_1$ and $R_2$, are preferably connected so that their first fluctuation is an amplitude increase in a positive direction and the electrical pulse generators 32 and 36 are arranged so that they begin to generate a pulse at the moment the receiver signals undergo their first negative fluctuation.

The individual receiver signals usually have the wave forms and relative times of occurrence schematically illustrated in FIGURE 3 as $R_1S$, $R_2S$, and $R_3S$. The switching arrangement shown in FIGURE 2 converts such signals to a transmission line signal having the wave form designated as TSL. Thus, the signals transmitted to the surface units have a time, amplitude and shape correspondent with the first waves of the seismic or acoustic energy that is propagated through the various intervals of rock. A visual displaying of these signals, on an oscillograph enables a person operating the instrument to detect instrument malfunctions at a time at which corrective measures can be effectively applied. In some cases, such a display provides identifying indications of portions of rock formations through which the seismic or acoustic energy is propagated in characteristic manners. For example, it has been found that in porous sands or vuggy limestones the amplitudes of the first fluctuations of the receiver signals are characteristically smaller than the corresponding fluctuations in adjacent formations.

As will be clear to those skilled in the art of acoustical well logging from the above description it is possible to obtain the advantages of this invention using a different combination of long and short intervals than that described above. For example one could use a combination of two transmitters and one receiver where both transmitters are located to one side of the receiver and form the long and short interval with the receiver. Furthermore in some cases it may be desirable to utilize more than two intervals, for example, three or four intervals. Also, it is possible to convert the signals from the transducers to other electrical quantities, which are a function of the time intervals of interest. For example, voltages, impedances, frequencies and similar electrical quantities may be used. Accordingly, this invention should not be limited to the specific details described above but only to its broad spirit and scope.

We claim as our invention:

1. A method of well logging comprising: traversing a section of the borehole of the well with an array of acoustic impulse producing and receiving stations while producing and receiving acoustic impulses within said array; producing indications of the time required for said impulses to travel through the rock formations between a pair of like acoustic stations that are separated by an interval shorter than the thickness of the thinnest individual rock strata to be detected in the rock formations surrounding said well; during the same traverse of this borehole producing indications of the time required for said impulses to travel through the rock formations between a pair of like acoustic stations that are separated by an interval longer than the thickness of the thinnest individual rock strata to be detected in the rock formations surrounding said well; detecting the depth at which the travel times are measured and recording the time required for said impulses to travel through said intervals.

2. An acoustic well logging process comprising:
    (1) disposing three acoustic receiving stations along the axis of the borehole of a well with two of said stations separated by a short interval that is shorter than the thinnest earth formation in which the velocity of acoustic energy is to be measured and two of said stations separated by a long interval that is several times longer than the short interval;
    (2) moving said three stations in a traverse of a section of the borehole while generating a succession of acoustic impulses at a point a fixed distance on one side of said three stations;
    (3) measuring the difference between the times required for said acoustic impulses to travel through the earth formations intervening between the point of generation and each of the receiving stations that are separated by said short interval and producing indications of the velocities at which the impulses travel through the earth formations adjacent to said short interval;
    (4) measuring the differences between the times required for said acoustic impulses to travel through earth formations intervening between the point of generation and each of the receiving stations that are separated by said long interval and producing indications of the velocities at which the impulses travel through the earth formations adjacent to said long interval;
    (5) obtaining each of said velocity indications during the same traverse of a section of the borehole and measuring the depths at which each of said velocity indications are obtained.

3. A method of logging by the process of claim 2 comprising: recording the depths at which the velocity indication obtained over the short interval is different from those obtained over the long interval to record the depths of earth formations thinner than said long interval.

4. A process of logging in accordance with claim 3 comprising: recording quantities related to the velocity indications obtained over the short and long intervals and the measured depths at which the velocity indications were obtained to record the variations with depth in the individual acoustic velocities within discrete earth formations thicker than said short interval and the average acoustic velocities through pluralities of earth formations adjacent to said long interval.

References Cited by the Examiner

UNITED STATES PATENTS

| | | | |
|---|---|---|---|
| 2,101,408 | 12/1937 | Muzzey | 181—.5 |
| 2,207,281 | 7/1940 | Athy et al. | 181—.53 |
| 2,233,992 | 3/1941 | Wyckoff | 181—.53 |
| 2,691,422 | 10/1954 | Summers et al. | 181—.53 |
| 2,708,485 | 5/1955 | Vogel | 181—.53 |
| 2,722,282 | 11/1955 | McDonald | 181—.53 |
| 2,865,463 | 12/1958 | Itria | 181—.53 |

BENJAMIN A. BORCHELT, *Primary Examiner.*

ISAAC LISANN, CHARLES W. ROBINSON, JOHN C. MacNAB, CHESTER L. JUSTUS, *Examiners.*

M. J. MARNOCK, A. E. HALL, V. J. DIPIETRO, J. W. MILLS, R. M. SKOLNIK, *Assistant Examiners.*